United States Patent
David et al.

(10) Patent No.: US 7,080,703 B2
(45) Date of Patent: Jul. 25, 2006

(54) PEDESTRIAN TRUCK

(75) Inventors: Bernd David, Henstedt-Ulzburg (DE);
Sebastian Lehnart, Hamburg (DE)

(73) Assignee: Jungheinrich Aktiengesellschaft (DE)

( * ) Notice: Subject to any disclaimer, the term of this patent is extended or adjusted under 35 U.S.C. 154(b) by 0 days.

(21) Appl. No.: 10/922,453

(22) Filed: Aug. 20, 2004

(65) Prior Publication Data

US 2005/0039957 A1    Feb. 24, 2005

(30) Foreign Application Priority Data

Aug. 22, 2003   (DE) ................ 103 38 611

(51) Int. Cl.
*B62D 51/04*   (2006.01)
(52) U.S. Cl. .................... 180/19.1; 180/65.1
(58) Field of Classification Search .......... 180/19.1, 180/19.2, 19.3, 65.1, 65.5, 65.6, 65.8, 332, 180/315
See application file for complete search history.

(56) References Cited

U.S. PATENT DOCUMENTS

| | | | | |
|---|---|---|---|---|
| 2,401,113 A * | 5/1946 | Schroeder | .................... | 200/5 R |
| 2,645,297 A * | 7/1953 | Wennberg et al. | .......... | 180/65.1 |
| 2,902,105 A * | 9/1959 | Wiley et al. | ................. | 180/274 |
| 2,942,679 A * | 6/1960 | Gibson | ...................... | 180/274 |
| 3,168,157 A * | 2/1965 | Ulinski | ...................... | 180/65.1 |
| 3,190,994 A * | 6/1965 | Becker et al. | ........... | 200/61.85 |
| 3,300,612 A * | 1/1967 | Quayle | ........................ | 200/559 |
| 3,465,841 A * | 9/1969 | Harshbarger et al. | ....... | 180/65.1 |
| 3,724,586 A * | 4/1973 | Goodacre | .................... | 180/274 |
| 3,738,441 A * | 6/1973 | Kemner | ...................... | 180/65.1 |
| 3,791,474 A * | 2/1974 | Stammen et al. | ........... | 180/332 |
| 4,444,284 A * | 4/1984 | Montemurro | ............... | 180/19.1 |
| 5,245,144 A * | 9/1993 | Stammen | ................. | 200/61.85 |
| 5,964,313 A * | 10/1999 | Guy | ........................... | 180/332 |
| 6,227,320 B1 * | 5/2001 | Eggert et al. | ............... | 180/19.2 |
| 6,276,485 B1 * | 8/2001 | Eriksson et al. | ............. | 180/332 |
| 6,464,025 B1 * | 10/2002 | Koeper et al. | ............. | 180/19.2 |
| 6,595,306 B1 * | 7/2003 | Trego et al. | ................ | 180/19.2 |
| 6,776,249 B1 * | 8/2004 | Fortin | ........................ | 180/19.3 |

FOREIGN PATENT DOCUMENTS

DE    196 07 976 A1    9/1997
DE    197 38 586 A1    3/1999

* cited by examiner

*Primary Examiner*—Tony Winner
(74) *Attorney, Agent, or Firm*—Peter J. Bilinski

(57) ABSTRACT

A pedestrian truck with a drive motor and a handle lever includes a head and a rod, which is articulated to a steering base of the industrial truck about a horizontal axis and in which the drive wheel driven by the drive motor is mounted. A first control or regulating device for the drive motor, a steering motor for auxiliary steering, a second control or regulating device for the steering motor and a sensor device which produces a set signal for the second control or regulating device according to the extent of a steering movement of the handle lever are provided, the handle lever rod acting on the steering base via two horizontally spaced pivot points and at least one sensor being associated to each pivot point to measure the force between the handle lever rod and the steering base. The second control or regulating device produces a control signal for the steering motor from the signals of the two sensors.

7 Claims, 3 Drawing Sheets

PEDESTRIAN TRUCK

FIELD OF THE INVENTION

The invention relates to a pedestrian truck according to a pedestrian truck with a drive motor and a handle lever having a head and a rod which is articulated to a steering base of the industrial truck about a horizontal axis and in which the drive wheel driven by the drive motor is mounted, a first control or regulating device for the drive motor, a steering motor for auxiliary steering, a second control or regulating device for the steering motor and a sensor device which produces a set signal for the second control or regulating device according to the extent of a pivot movement of the handle lever.

BACKGROUND OF THE INVENTION

Pedestrian trucks with steering handle levers form part of a large group of industrial trucks. The handle lever consists of a handle lever tube or a handle lever rod and a handle lever head. The handle lever rod is articulated on a steering base about a horizontal axis and can be moved between a vertical position, in which simultaneously a brake is actuated via a suitable device, and a pivoted position relative thereto, in the latter the vehicle being steered driven. It is generally known to accommodate steering provisions on the handle lever head, such as for example actuation elements for the travelling drive and the lifting and lowering operation. It is also known from DE 196 07 976 to associate a force measuring device to the handle lever, which produces a voltage depending on the actuation direction of the handle lever and the pull or thrust force applied to the handle lever, which is transmitted to a controller to set the rotational direction and to produce a current for the drive motor torque. In this connection it is also known to arrange the force sensor, which is intended to measure the pull or push forces, between two movable parts of the handle lever, for example between the handle lever head and the handle lever rod.

It is also known from DE 197 38 586 to design a section connected to the handle lever head which is movable relative to the remaining handle lever rod and to provide between the movable sections a spring arrangement which holds the sections in a neutral position. Between the movable sections a sensor is further arranged which according to the extent of relative movement produces a signal for the motor control. The sensor is a path sensor and produces a signal dependent on the deflection of the handle lever head and which is transmitted to a position regulator which produces a set value for a current regulator which is compared to the actual current value of the motor to produce a control signal for the motor torque.

In the two disclosed drive controls or regulators a load-dependent, force-dependent or speed-dependent pull or push force control is possible at an ergonomically comfortable level. The operator feels as if a vehicle is being pulled or pushed without being driven. The operating forces are known to increase with increased load.

It is also known in industrial trucks operated by handle levers to provide auxiliary steering. A steering motor acts via a transmission on the steering base and thus on the steered wheel to facilitate the handling of the vehicle, in particular for large loads.

SUMMARY OF THE INVENTION

The object of the invention is to determine and utilise in a simple manner forces acting on a handle lever of a pedestrian truck, for auxiliary steering.

This object is achieved by the present invention.

In the pedestrian truck according to the invention, the handle lever rod is articulated via two horizontally spaced pivot points on the steering base. This is not new per se. At least one sensor is arranged at each pivot point to measure the force between the handle lever rod and the steering base. Pull or push forces on the handle lever rod act on the two sensors in the same direction, and can therefore be added together. If on the other hand the handle lever is pivoted, this results in signals from the sensors in opposing directions at the pivot points. These signals can be used for an auxiliary steering force device. In slightly larger pedestrian trucks auxiliary steering is very advantageous. A steering motor is required for this. The moment of the steering motor is set according to the extent of the signals at the pivot points. The sensors on the pivot points can therefore determine the set value for the steering motor.

According to an embodiment of the invention it is however perfectly sufficient if the sensors are arranged such that they measure the horizontal force components at the pivot points. This is because the steering force acts exclusively in a horizontal plane.

The pull and push force acting on the handle lever rod is generally applied at an angle to the vertical or the horizontal on the axis of the pivoting assembly. This angle is altered to a limited extent depending on the handling of the industrial truck and the size of the operator. Thus the vertical and horizontal force components are also of different sizes. By arranging sensors at each pivot point to measure the horizontal force components it is similarly possible to determine pull or push forces acting on the handle lever tube in a sufficiently precise manner and to produce a corresponding control signal for the first control or regulating device. Of course it is also possible to measure the vertical forces at the pivot point with a special sensor per pivot point and from the resulting horizontal and vertical components to produce a signal corresponding to the actual pull or thrust forces.

It is conceivable to allow the handle lever to act directly on force sensors in the region of the pivot point, which for their part slightly yield resiliently. The handle lever naturally has to be returned into the neutral position after completing the force application. Alternatively in an embodiment of the invention, it is proposed that between a bearing pin and a bearing aperture of the steering base receiving the bearing pin, a resiliently yielding element is arranged, for example a ring or a disc made from yielding material. Thus for example a resilient ring can be embedded in bearing apertures, through whose aperture a bearing pin extends. The sensors cooperate with the bearing pins or with the ends of a continuous bearing pin, whereby a relative movement between the sensor and the bearing pin leads to a corresponding sensor signal. The arrangement of a spring element on the pivot points of the handle lever rod has the advantage that a defined neutral position is reached due to the restoring force of the spring elements.

It is known to measure the tilt of a handle lever in an industrial truck steered by a handle lever, in particular to detect the angular positions in the region of the vertical and the horizontal, to actuate a brake and switch off the drive motor. This occurs for safety reasons. According to an embodiment of the invention the signals from the sensors measuring the vertical and horizontal forces are used to determine the direction of the resultant force. This substantially corresponds to the tilt of the handle lever. Thus the tilt angle of the handle lever is easily detected. A processor is required for this which is however in any case present in the control or regulating device.

BRIEF DESCRIPTION OF THE DRAWINGS

The invention will be described below in more detail with reference to the drawings, in which.

DETAILED DESCRIPTION

Figure 1:
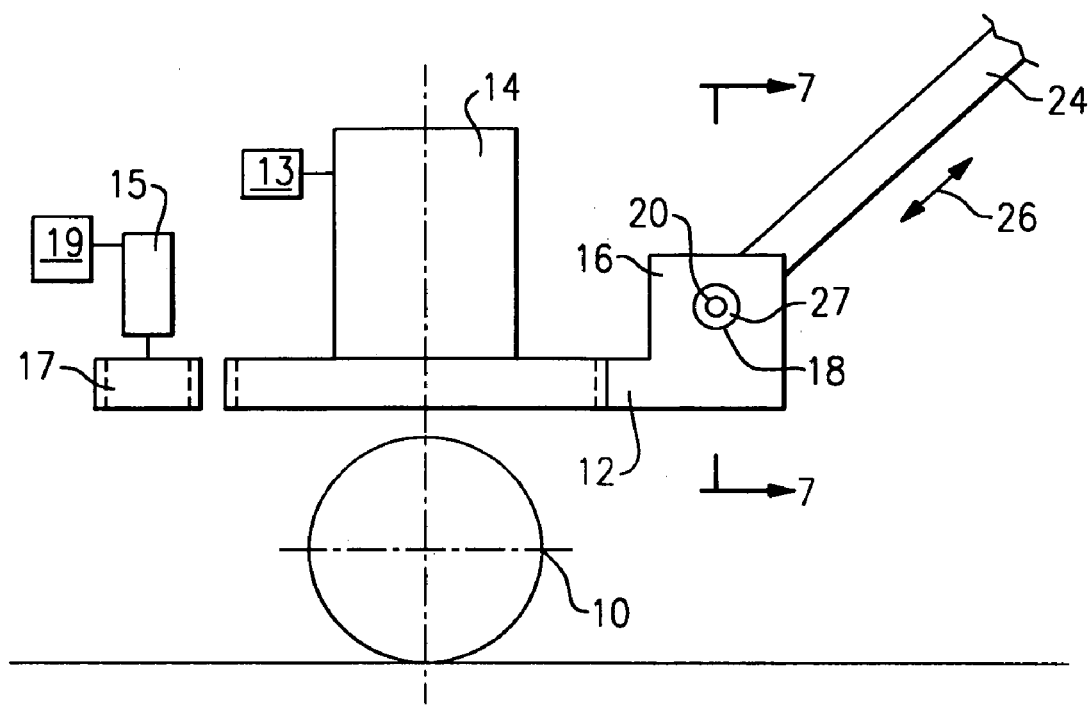
FIG. 1 is a diagrammatic view of the drive part of an industrial truck steered by a handle lever, with a handle lever.

A drive wheel (10) of a pedestrian truck not shown further is rotatably mounted about a horizontal axis in a steering base (12). Located on the steering base is a drive motor (14), by which the drive wheel (10) is driven. A control and regulating device for the drive motor (14) forms part of the industrial truck, the control and regulating device shown schematically as (13) in FIG. 1. Furthermore, a steering motor (15) is shown which rotates the steering base via a transmission (17). A second control and regulating device belongs thereto shown schematically as (19) in FIG. 1.

The steering base (12) comprises a fork section (16), with horizontally spaced bearing apertures (18) through which a bearing pin (20) extends. In the bearing apertures (18) a resilient ring (27) is embedded with a central aperture, through which the bearing pin (20) extends. Therefore the pin (20) is resiliently flexibly mounted. Connected to the pin is a handle lever rod (24), whose details are not further shown. If a pull or thrust force is exerted on the handle lever rod (24) in the direction of the double arrow (26), the pin (20) is deflected according to the actuation direction of the handle lever rod (24), the extent of the deflection being dependent on the push or thrust force applied. A pivot force on the handle lever (24) leads to a deflection of the pin (20).

In FIGS. 2 to 5, the pivot assembly is again diagrammatically shown. A handle lever head (28) is also shown via which the operator acts on the handle lever.

It is also clear from FIGS. 2 to 5 that the bearing pin (20) acts on the steering base (12) in two horizontally spaced pivot points. Each of these pivot points is associated to a sensor, as is diagrammatically indicated in FIG. 1a by (30). The sensor is associated to the bearing pin (20). If the bearing pin (20) is moved relative to the sensor (30), as is approximately indicated by the double arrow (32), a corresponding sensor signal is produced. The size of the sensor signal is a measurement for the force acting on the pivot point, approximately in the horizontal direction.

Figure 2:
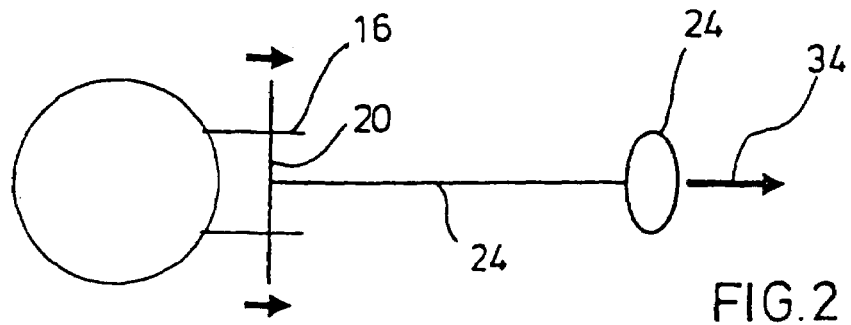
Figure 3:
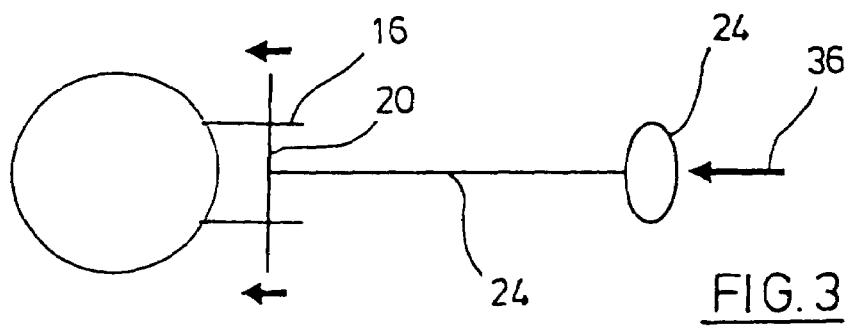

It is indicated in FIG. 2 that a pull force (34) is exerted on the handle lever rod (24). As a result two force components occur in the same direction at the pivot points or the force sensors arranged there. If on the other hand a push force (36) according to FIG. 3 is applied to the handle lever head (28), opposing force components in the same direction are produced which lead to a torque on the drive motor (14) in an opposing rotational direction. Therefore the size of the force components in the pull or push direction is a decisive factor for the torque on the drive motor (14). The direction of the force components is on the other hand a decisive factor for the rotational direction of the drive motor (14).

Figure 4:
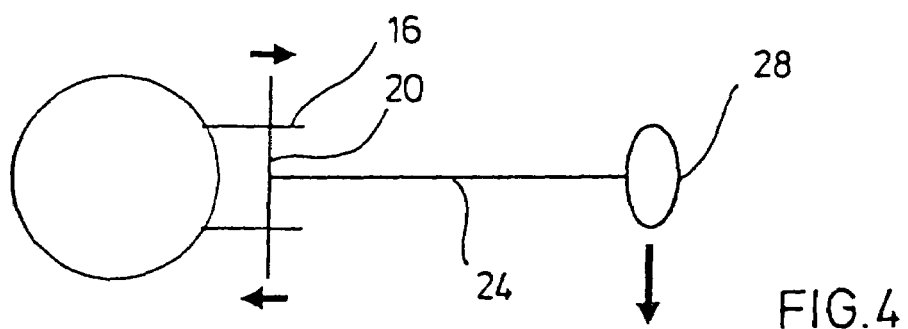
Figure 5:
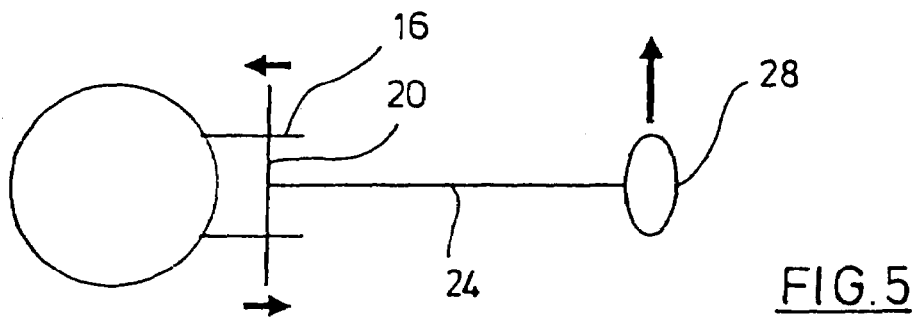

If on the other hand according to FIG. 4 or 5, a pivoting movement is carried out, opposingly directed force components are produced, whose size is used for determining a set value of the control or regulating device for the steering motor. To this end, it is used to rotate the steering base (12) about the vertical axis and to assist the operator during the steering movement. The direction of the force components acting in the opposite direction determines the rotational direction of the steering motor and the size of the force components of its torque.

Figure 1A:
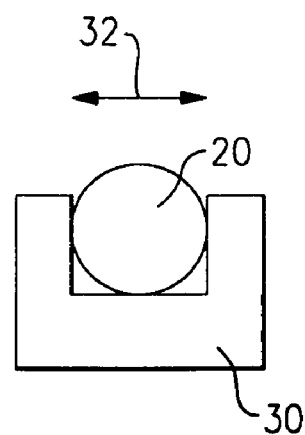
FIG. 1a shows a sensor for a pivot point of the handle lever according to FIG. 1, FIGS. 2 to 5 depict diagrammatically the drive part according to FIG. 1 in plan view in different drive and pivot directions.
Figure 6:
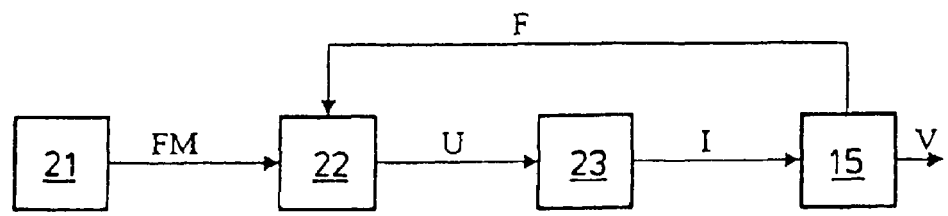
FIG. 6 is a circuit diagram for the auxiliary steering of the truck, and FIG. 7 a section view through the handle lever bearing taken thruogh line 7—7 of FIG. 1.

In FIG. 6, the block (21) shows the operator of the vehicle steered by a handle lever according to FIG. 1. A steering force FM is exerted on the sensor arrangement (22). Similar to this force the sensor arrangement (22) produces a drive voltage (U) which is transmitted to a regulating device (23) to produce a control signal (I) for the steering motor (15). This then drives the steered wheel (10) with the speed (v). The force or the moment (F) applied by the motor is, as shown, back-coupled to the sensor arrangement (22), which thus differentiates the forces or moments.

In the disclosed manner, the steering motor (15) is force-dependent actuated. Consequently, a follow-up control results, which gives the operator a pleasant steering sensation. The regulating device (23) utilises the voltage signal (U) obtained according to a predetermined algorithm, to produce the desired control signal (I). The regulating device (23) can contain a PID-Controller, to which a specific characteristic curve is applied.

Figure 7:
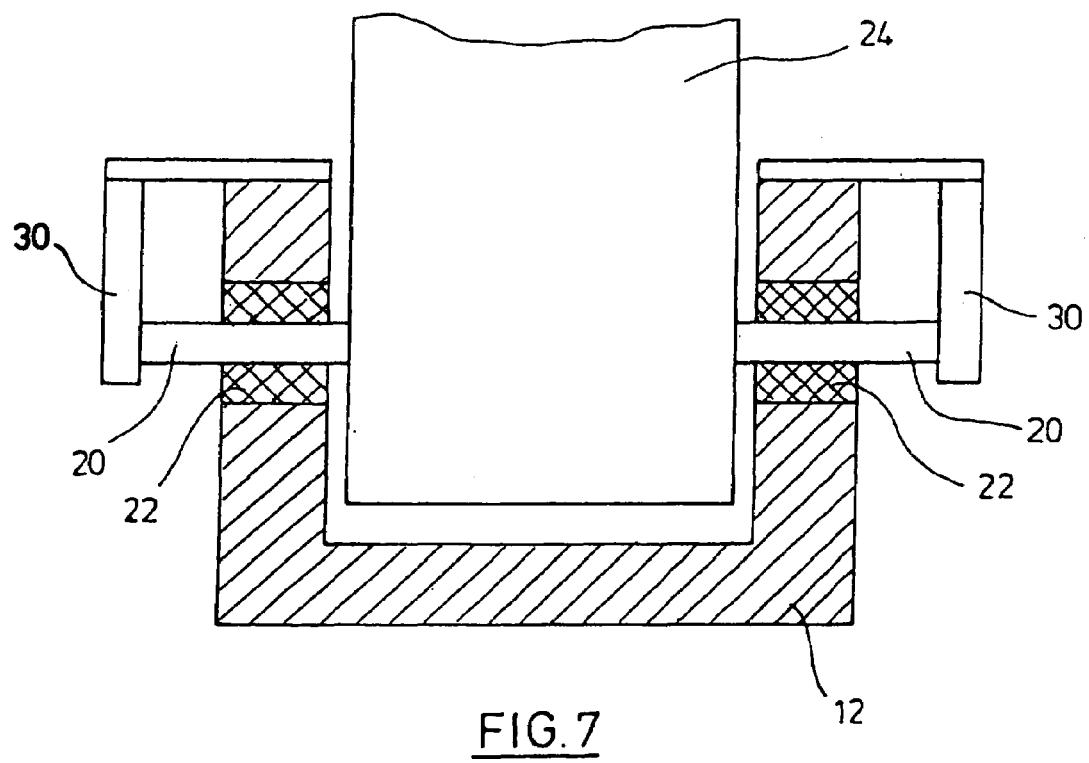

The positioning of the handle lever (24), according to the vehicle in FIG. 1, is more clearly shown in FIG. 7. However it does not appear to be necessary to disclose it in further detail.

The invention claimed is:

1. Pedestrian truck with a drive motor and a handle lever comprising:
    a head and a rod which is articulated to a steering base of the industrial truck about a horizontal axis and in which the drive wheel driven by the drive motor is mounted;
    a first control or regulating device for the drive motor;
    a steering motor for auxiliary steering;
    a second control or regulating device for the steering motor; and
    a sensor device which produces a set signal for the second control or regulating device according to the extent of a pivot movement of the handle lever, wherein the handle lever rod acts on the steering base via two horizontally spaced pivot points and at least one sensor is associated to each pivot point to measure the force between the handle lever rod and the steering base and the second control or regulating device produces a control signal for the steering motor from the signals of the two sensors.

2. Pedestrian truck according to claim 1, wherein the sensors measure the horizontal force components in the pivot points.

3. Pedestrian truck according to claim 1 wherein the first control or regulating device produces from the signals of the sensors a control signal for the drive motor dependent on the pull or thrust force applied to the handle lever.

4. Pedestrian truck according to claim 1, wherein a resilient yielding element is arranged between a bearing pin and the bearing apertures of the steering base receiving the bearing pin.

5. Pedestrian truck according to claim 4, wherein the resilient yielding element is formed from a ring or a disc or the like made from a resilient material.

6. Pedestrian truck according to claim 1, wherein the sensors also measure the vertical components of the force applied to the handle lever and a processor determines the direction of the resultant force from the horizontal and vertical force components to establish the tilt angle of the handle lever.

7. Pedestrian truck according to claim 6, wherein the processor stores the weight of the handle lever to calculate accurately the tilt angle in the handle lever.

* * * * *